US007038803B2

(12) United States Patent
Kimble

(10) Patent No.: US 7,038,803 B2
(45) Date of Patent: May 2, 2006

(54) METHOD AND APPARATUS FOR AFFIXING PRINT BANNER LABELS TO PRINTED FILES

(75) Inventor: Christopher John Kimble, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 10/015,157

(22) Filed: Dec. 11, 2001

(65) Prior Publication Data

US 2003/0106637 A1 Jun. 12, 2003

(51) Int. Cl.
*G06F 15/00* (2006.01)
*G06F 17/30* (2006.01)
*B41J 5/30* (2006.01)

(52) U.S. Cl. .................. 358/1.15; 358/1.15; 707/1; 400/61

(58) Field of Classification Search ............... 358/1.15; 707/104, 1, 120; 709/203; 715/500; 434/178; 400/61, 76, 582
See application file for complete search history.

(56) References Cited

U.S. PATENT DOCUMENTS

| 5,316,279 | A | | 5/1994 | Corona et al. ............... 270/1.1 |
| 5,547,178 | A | * | 8/1996 | Costello .................. 270/52.02 |
| 6,192,165 | B1 | * | 2/2001 | Irons ......................... 382/306 |
| 6,748,471 | B1 | * | 6/2004 | Keeney et al. ............. 710/220 |

* cited by examiner

*Primary Examiner*—Kimberly Williams
*Assistant Examiner*—Saeid Ebrahimi-Dehkordy
(74) *Attorney, Agent, or Firm*—Patterson & Sheridan, LLP

(57) ABSTRACT

A method and apparatus for affixing labels on printed output medium for separating print jobs. The method and apparatus include spooling at least one print file to a print queue. A print label program is executed to identify a first page of each print job in the print queue. A label application device coupled to a printer automatically affixes a label on the first page of each print job.

12 Claims, 7 Drawing Sheets

METHOD AND APPARATUS FOR AFFIXING PRINT BANNER LABELS TO PRINTED FILES

FIELD OF THE INVENTION

The invention relates to data processing and printing. More specifically, the invention relates to a method and apparatus for segregating and identifying printed subject matter.

BACKGROUND OF THE INVENTION

Current printers and copiers have the ability to print and insert cover sheets, colored banners or other inserts to sets, subsets, or chapters of print files. The printer or copier feeds the cover or slip-sheets, banners, or other inserts from separate paper trays at the proper times, which are automatically interleaved with the normal sequential output of the printed or copy sheets in a print job. For example, a printer may be a shared output device in a network having multiple users located at various computing devices. The cover sheets, banners, and the like conveniently separate each of the users printed output in a stack of printed materials accumulating at the shared printer. Furthermore, the cover sheets, banners, and the like may provide identifying information, such as person, source of origin, print job number, and the like.

The impact of printing undesirable content is considerable. For example, in the year 2000, there were an estimated 219 million ink jet printers and 200 million laser printers worldwide. Revenues for ink jet cartridges are expected to continue at a double-digit growth rate for the next five years. Moreover, revenues in the year 2000 for ink jet cartridges were $13.9B, while $8.5B for toner cartridges. Additionally, tab sheets or colored banners are usually more expensive than ordinary commercial grade printer/copier paper. As usage of printed material grows worldwide, the printing of such additional content becomes a wasteful consumption of the print medium materials, such as ink cartridges, toner cartridges, paper, and the like, which increases the overall costs of printing.

Therefore, there is a need in the art for a method and apparatus for separating and identifying printable content from hardcopy output devices, such as printers and copiers.

SUMMARY OF THE INVENTION

Provided are a method and apparatus for affixing labels on printed output medium for separating print jobs. The method and apparatus include spooling at least one print file to a print queue. A print label program is executed to identify a first page of each print job in the print queue. A label application device coupled to a printer automatically affixes a label on the first page of each print job contemporaneously with or after the first page of each print job prints.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention relates to a method and apparatus for providing sequential output stacking separation, and identification of multiple sheets, such as multiple sets or jobs of printed sheets outputted by a printer or copier. Specifically, printed labels are affixed to the first sheet of each print job, which are spooled for printing. That is, a label software program operates in tandem with, or is a part of, the operating system, application programs, and/or any print drivers that exist on a computer device, such as a print server. In one embodiment of the invention, the label program affixes a label on the first page of each print job spooled in the print server. Additionally, each label is provided with identifying information thereon. Although the present invention is discussed in terms of a network having a print server, it should be understood that the invention is also applicable for any other type network having a shared printer.

As described in detail herein, aspects of the preferred embodiment pertain to specific method steps that are implemented on computer systems. In one embodiment, the invention may be implemented as a computer software product for use with a computer system. The programs of the software product define the functions of the preferred embodiment and may be delivered to a computer via a variety of signal-bearing media, which include, but are not limited to, (a) information permanently stored on non-writable storage media (e.g., read-only memory devices within a computer such as CD-ROM disks readable by CD-ROM drive); (b) alterable information stored on writable storage media (e.g., floppy disks within diskette drive or hard-disk drive 114); or (c) information conveyed to a computer by a communications medium, such as through a computer or telephone network, including wireless communications. Such signal-bearing media, when carrying computer-readable instructions that direct the functions of the present invention, represent alternative embodiments of the present invention. Alternate embodiments may include implementation of the inventive print software program as an application program stored on the computer, as program code stored in a device driver or on an output device itself, or on a network device such as a server or firewall, as discussed in further detail below.

Figure 1:
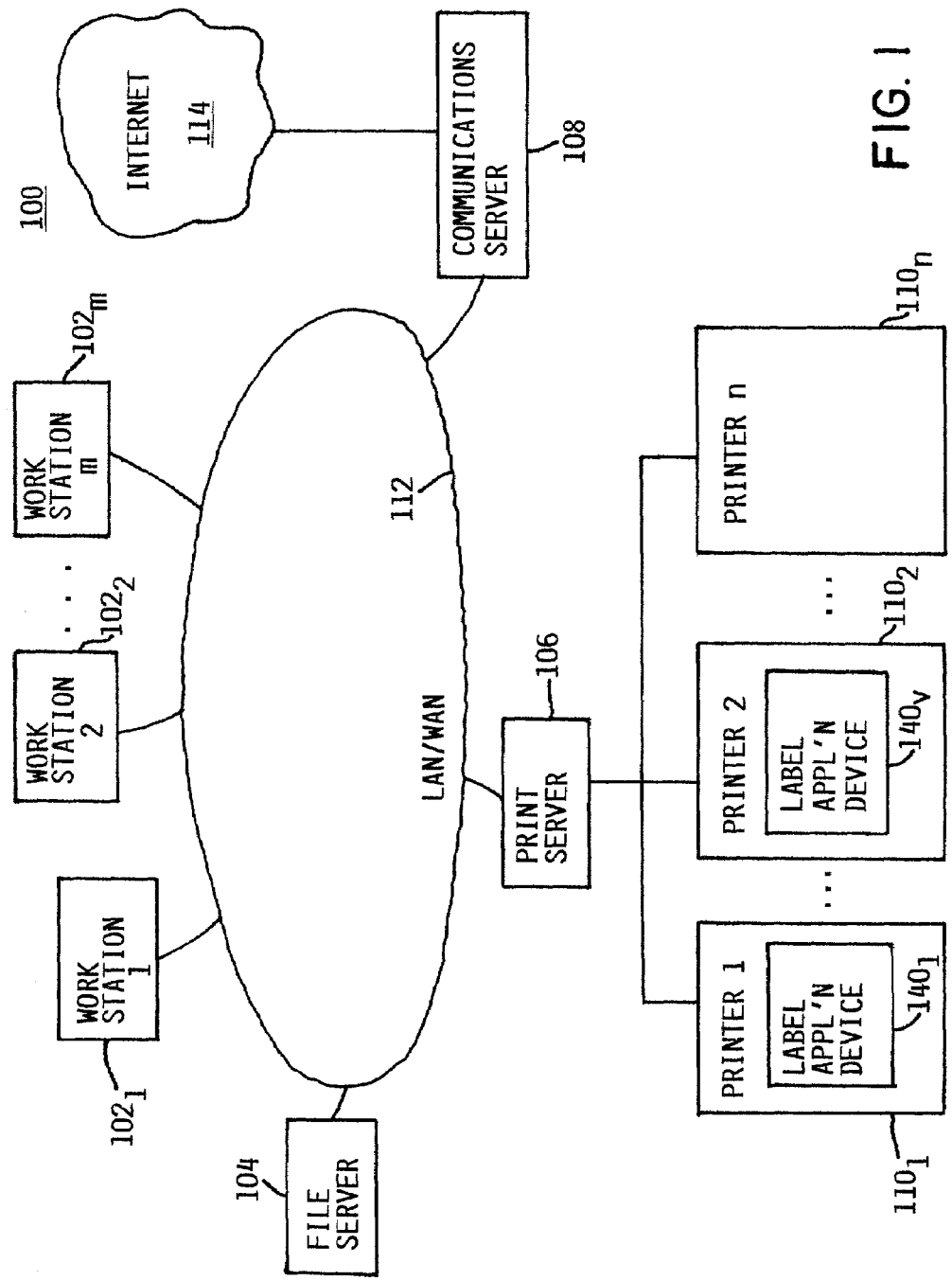
FIG. 1 depicts a block diagram of a communications network having at least one shared printing device.

FIG. 1 depicts a block diagram of a communications network 100 having at least one shared printing device $110_n$. In one embodiment, the communications network 100 comprises at least one workstation $102_1$ through $102_m$ (collectively workstations 102) and a print server 106 having one or more shared printing devices $110_1$ through $110_n$ (collectively printers 110). Optionally, one or more file servers 104 and/or communication servers 108 may be coupled to the communications network 100 to provide additional resources, such as the Internet 114, to the users at each of the workstations 102. In one embodiment of the invention, the workstations 102 may be a desktop computer; however, a person skilled in the art will recognize that a laptop computer, server, hand-held device, and the like may alternately be utilized.

The printing devices 110 may include printers such as laser jets, ink jets, dot matrix printers, copiers, scanners, or any other output device, which reproduces an image (e.g., text, graphics, pictures and the like) using a consumable reproduction medium. For purposes herein, consumable reproduction medium includes materials, which are consumed during the operation of reproducing an image such as toner, ink cartridges, ink coated ribbons, paper, and the like. Furthermore, for purposes of better understanding the invention, the printing devices 110 are discussed hereinafter in terms of a "printer", although such terminology is not considered as limiting. The printing devices 110 include a label application device $140_1$ through $140_v$ (collectively label application devices 140), which are responsible for printing identifying information for each print job on the labels, and then affix the printed labels to the first sheet of each print job, as with regard to FIG. 3 below. The printing devices 110 of the present invention comprise a label application device 140, which is discussed in further detail below.

The workstations 102 and printers 110 on the communications network 100 each form a node, which are illustratively coupled together via ETHERNET cabling 112 forming a local area network or wide area network (LAN/WAN). Alternately, the communications network 100 may be a wireless communications illustratively operating under the "Bluetooth", IEEE 802.11 family standards, Open Air industry standards, Shared Wireless Access Protocol (SWAP), and HiperLAN family standards, which are hereby incorporated by reference herein. For example, both the Bluetooth and the 802.11 standards provide for wireless technology that supports both point-to-point and point-to-multipoint connections. In an alternate embodiment (not shown), the workstations 102 may be coupled to the printers 110 without interfacing with the print server 106. Specifically, the one or more printers 110 are coupled to and controlled by the workstation 102 directly.

Figure 2:
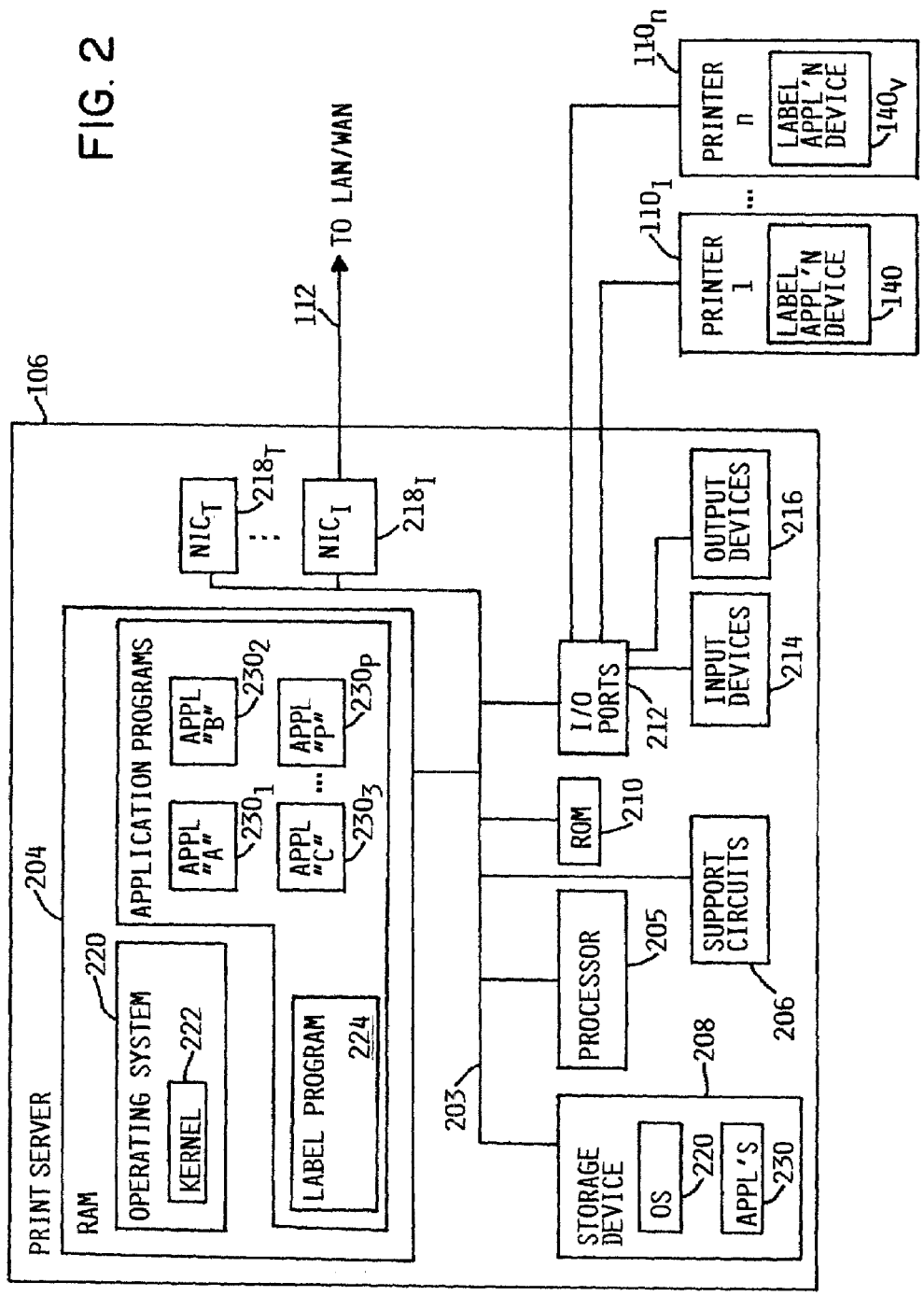
FIG. 2 depicts a block diagram of a print server coupled to the communications network of FIG. 1.

FIG. 2 depicts a block diagram of the print server 106 coupled to the communications network 100 of FIG. 1. The print server 106 comprises at least one system interconnect, e.g., bus 203, to which various components are coupled and communicate with each other. Specifically, a processor 205, storage device 208, memory such as random access memory (RAM) 204, read only memory (ROM) 210, input/output (I/O) ports 212, and other support circuits 206 are coupled to the system bus 203. Furthermore, one or more output devices 216, such as a display, as well as one or more input devices 214 such as a keyboard and/or pointing device are respectively coupled to the I/O ports 212. The input and output devices 214 and 216 permit user interaction with the print server 106.

Additional input/output devices include one or more network interface cards (NIC) $218_1$ through $218_t$ (collectively network interface cards 218). The NICs 218 provide connectivity to the one or more communications networks such as the LAN/WAN 112. In FIG. 2, the first NIC $218_1$ is illustratively an ETHERNET® adapter card.

The processor 205 sends and receives information to and from each of the workstation components coupled to the system bus 203 and performs system operations based upon the requirements of the workstation's operating system 220 and application programs 230 that are installed thereon. The processor 205 may be an Intel PENTIUM® type microprocessor, an IBM Power PC® processor, or the like.

The ROM 210 typically includes a Basic Input-Output System (BIOS) program, which controls basic hardware operations such as the interaction of the microprocessor 205 with the keyboard/mouse input device 214, hard disk 208, or video display 216, and the like. The storage device 208 is a permanent storage medium such as a hard disk, CD-ROM, tape, or the like, which stores the operating system 220 and applications programs 230.

The RAM 204 is volatile memory (e.g., SRAM, DRAM, MRAM and the like). The contents of the RAM 204 may be retrieved from the storage device 208 as required. Illustratively, the RAM 204 is shown with the operating system 220 and application programs 230 "A" through "P" concurrently stored therein. The program code of the operating system 220 and/or application programs 230 is sent to the RAM 204 from ROM 208 for temporary storage and subsequent execution by the processor 205.

The I/O port 212 includes various controllers (not shown) for each input device 214 such as a keyboard, mouse, joystick, and the like, as well as the output devices 216 such as an Ethernet network adapter, infrared device and display (not shown). Typically, other support circuits 206 include controllers for the storage device 208, floppy drive, graphics display, and the like (not shown).

The operating system (OS) 220 may illustratively be any one of IBM's operating systems (e.g., OS/400) or Microsoft's WINDOWS® operating systems (e.g., Windows NT®), or any other operating system 220 that provides graphical user interfaces (GUI) for user interaction. The operating system 220 is capable of interfacing with all of the hardware components of the print server 106. The applications programs 230 are specialized programs such as anti-virus programs, web browsers, and the like. The executable and library files (not shown) of the operating system 220 and application programs 230 are individually transferred from the storage device 208 to the RAM 204 for processing as needed. The transfer of the executable files may be controlled by a memory management system such as on-demand paging. A page is a fixed amount of data that is sent to the RAM 204 for subsequent execution by the microprocessor 205. The RAM 204 may simultaneously store a plurality of pages of data to accommodate various files being processed by the operating system 220 and application programs 230 that are concurrently running. Thus, the RAM 204 is capable of storing files from the operating system 220, as well as files from one or more applications programs $230_1$ through $230_p$ (collectively applications programs 230).

In order to oversee the execution of all the files opened, a kernel 222 is stored in the RAM 204. The kernel 222 is a central module of the operating system that is initially loaded into the RAM 204. The kernel 222 is installed at dedicated addresses in the RAM 204 and is responsible for memory management, process and task management, and disk management. The kernel 222 manages one or more files that are open during the course of operation.

In one embodiment, a label program 224 of the present invention is stored at the print server 106 for shared applications, illustratively, in a client/server relationship. For purposes of clarity and understanding the invention, the label program 224 is discussed as being a separate application program 230. The label program 124 is loaded into the RAM 204 upon user activation of such application program. The label program 224 identifies print job information from one or more print files spooled by the printers 110. The label program 224 comprises any software program that provides identifying information for print jobs, as similarly printed on present cover sheets, banners, and the like. The label program 224 controls the printing of the identifying information on labels by the label application device 140 and the printer 110. Furthermore, the label program 224 controls affixing the labels to the printed sheets of each print job, as discussed in further detail below.

In a second embodiment, the label program 224 may be incorporated as part of the operating system 220. As such, upon "boot-up" of the print server 106, the label program 224 is loaded into the RAM 204 along with other executable files (not shown) of the operating system 220. In a third embodiment, the label program 224 may be an application program stored in memory of the workstation 102. In this third embodiment, the label program 224 operates in tandem with other application programs stored on the workstation 102 and is executed upon each print request by such other application programs. In a fourth embodiment, the label program 224 may be program code incorporated into one or more device drivers on a workstation 102. In this fourth embodiment, the label program 224 is activated only when a specific device driver (e.g. a printer device driver) is utilized by the operating system of a workstation 102. In a fifth embodiment, the label program 224 is loaded onto the individual printing devices 110. For example, typically a printer or copier has firmware, which provides some intelligence to the device. Accordingly, the firmware may be configured to implement the functions of the label program 224. In this fifth embodiment, a user may key in specific key sequences to activate and utilize the label program 224 or send a command to the printer via a printer interface program.

Figure 4B:
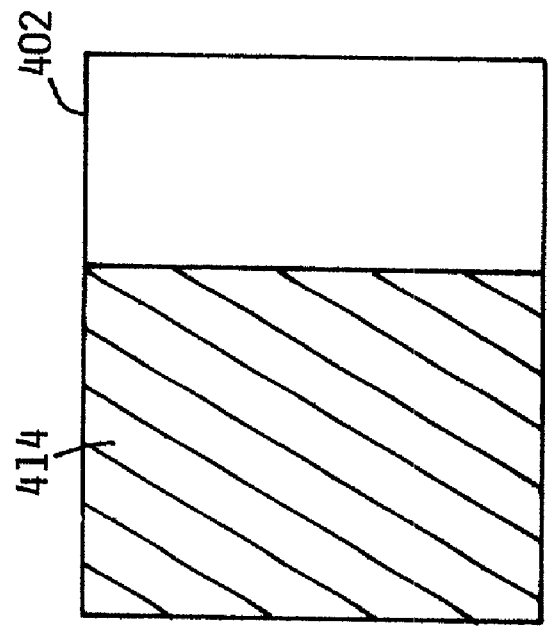
FIGS. 4A and 4B depicts an identifying label of the present invention.
Figure 4A:
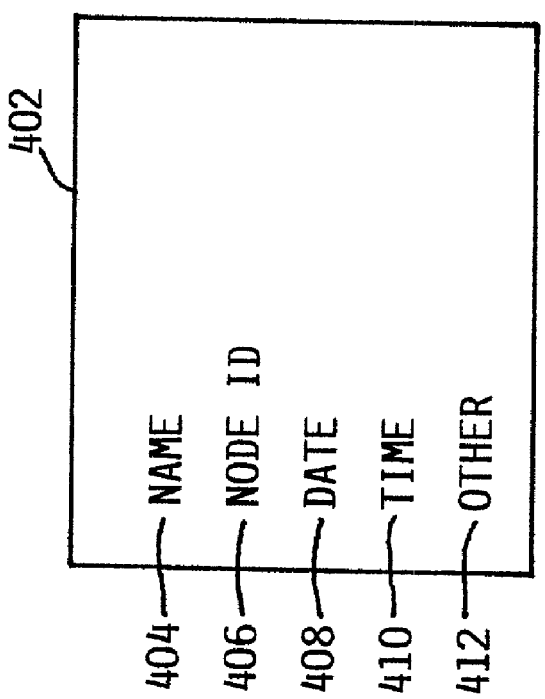

FIGS. 4A and 4B depicts an identifying label 402 of the present invention. In particular, FIG. 4A depicts the front of the label 402 illustratively showing identifying subject matter for a typical print job. For example, some identifying information for each print job may include the name of the print requester 404, node identification 406 (i.e., the source where the print job originated), the date 408, time 410, and/or any other identifying information 412 deemed relevant.

FIG. 4B depicts the backside of the label 402 having an adhesive 414 covering a portion of the backside of the label 402. The label 402 may be any label having an adhesive on the back thereof, such as a POST-IT® by 3M Corporation, or any other commercially available labels. Alternately, the labels 402 may be rolled or in any other arrangement depending on the label application device 140 utilized along with the printer 110.

Figure 5:
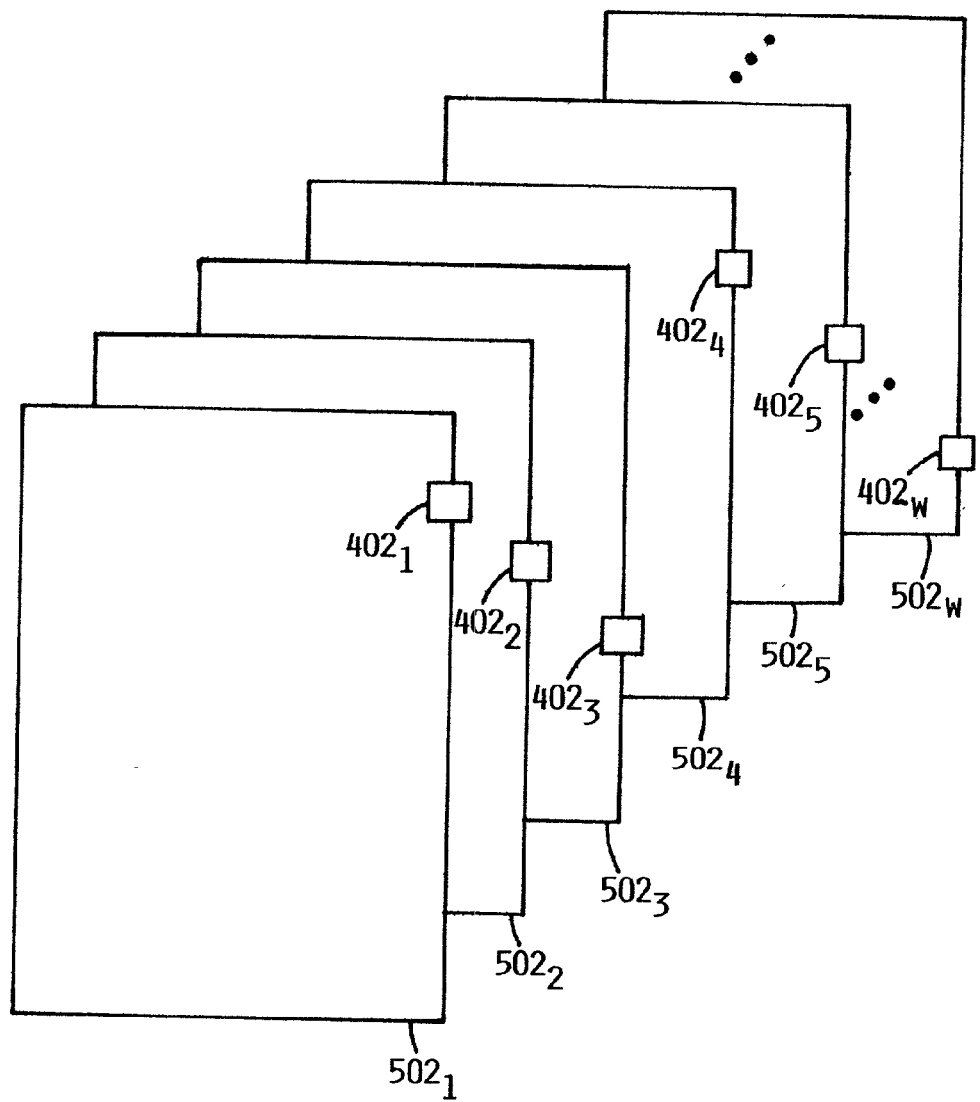
FIG. 5 depicts the identifying labels of FIG. 4 affixed to a stack of print jobs.
Figure 6:
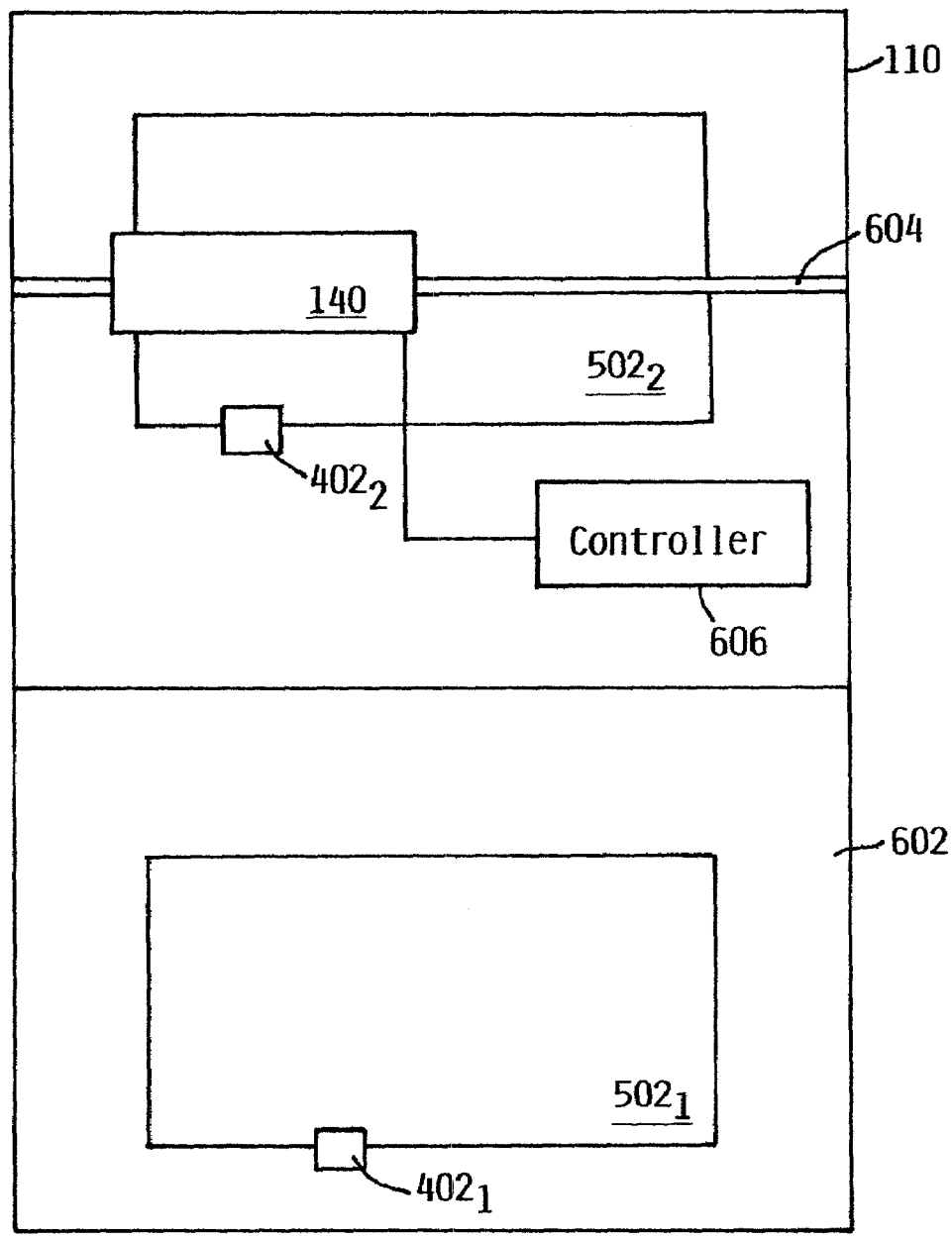
FIG. 6 depicts a top view of one embodiment of a printer having a label application device of the present invention.

FIG. 6 depicts a top view of one embodiment of a printer 110 having a label application device 140 of the present invention. The label application device 140 is housed in the printer 110 proximate an output tray 602 formed or attached to the printer 110. The label application device 140 is coupled to a controller 606 and is disposed over a printed side of a sheet of paper 502 (see FIG. 5) for selectively affixing a label 402 to the printed side of the sheet 502. In one embodiment, the label application device 140 is mounted to one or more tracks 604, which provide mobility to the label application device 140 to further allow attachment of the label 402 to selective portions (e.g., the margin) of the first sheet 502 of the print job. As such, the label application device 140 may traverse along the track and across the sheet of paper 502 as it is printed out.

Figure 7A:
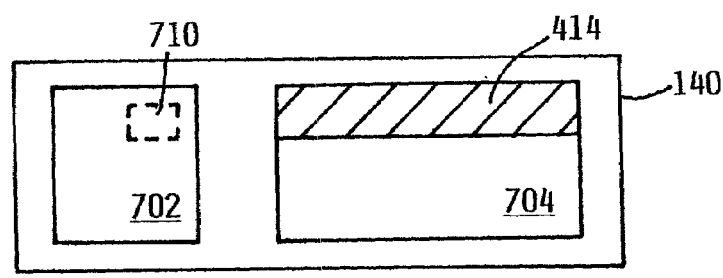
FIGS. 7A and 7B depict top and side views of the label application device of the present invention.
Figure 7B:
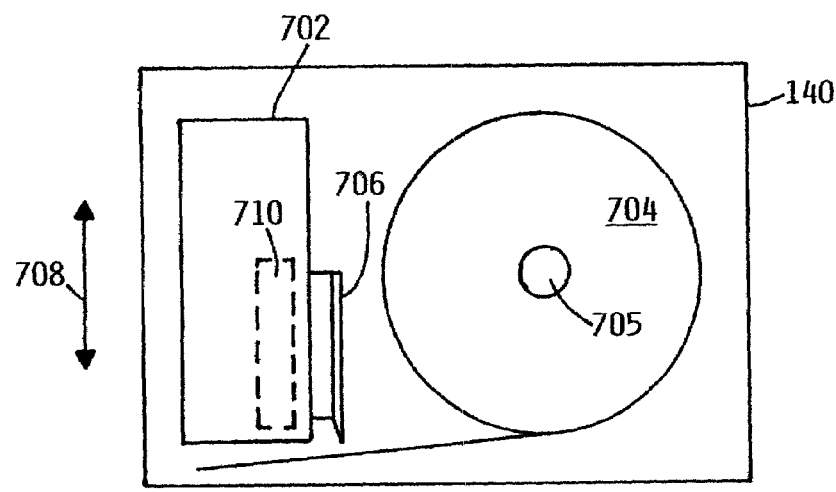

FIGS. 7A and 7B depict top and side views of the label application device 140 of the present invention. In one embodiment, a roll of labels 704 is housed in the label application device 140. Illustratively, the roll of labels 704 is mounted on an axial mounting member 705, which allows rotation of the roll 704 and facilitates replacement and replenishment of the roll 704. Persons skilled in the art will recognize that the axial mounting member 705 is merely illustrative and that any other label support member or label dispensing unit may be used to advantage. A label print head 702 is disposed proximate the roll of labels 704 within the label application device 140. The label print head 702 prints the relevant print job information onto the labels 402. In one embodiment, a label separator 706 (e.g., cutter) is coupled to the label print head 702 to selectively separate the printed label from the roll of labels 704 to form discrete labels 402.

In the embodiment shown in FIGS. 7A and 7B, the label print head 702 moves in a substantially vertical (as shown by arrow 708) and perpendicular direction to the unrolled labels. Additionally, the label print head 702 moves in a direction substantially perpendicular to the sheet of paper 502 being printed to push the discrete label 402 onto the sheet of paper 502. In a second embodiment, a piston 710 (drawn in phantom) may be disposed within or proximate the label print head 702 and substantially perpendicular to the sheet of paper 502. In this second embodiment, the label print head 702 remains stationary, while the piston 710 is actuated and moves in a direction substantially perpendicular to the sheet of paper 502 being printed to push the discrete label 402 on the sheet of paper 502. Persons skilled in the art will recognize that the movement of the label print head 702 or the piston 710 may be accomplished by the provision of any known or unknown actuating mechanisms. Furthermore, although the label print head 702 is discussed as a discrete component for printing only the labels 402, the invention contemplates that the label print head 702 may also be the same, integral, or common to a printer print head (not shown) used by the printer 110 for printing the sheets of paper 502.

The controller 606 controls the label affixing operation and may be the same controller (e.g., processor and support circuits) used to control the entire printer 110. The controller 606 is electrically coupled to the label print head 702 and comprises processing circuitry (not shown) to control the printing, placement, separating, and affixing the label 402 onto the first sheet 502 of each print job. In particular, the controller 606 positions the label print head 702 over a specified portion of the sheet of paper 505 and causes the label print head 702 to print the print job identifying information onto the label 402. The label separator 706 separates (e.g., cuts) the label 402 after printing of the label 402 is complete. In another embodiment, each label 402 of the roll of labels 704 may be perforated in order to facilitate detachment of the labels 402. In such embodiment, detachment may be accomplished without the use of the separator 706. Specifically, the label print head 702 may be actuated downwardly with sufficient force to hold a label 402 against a sheet 502 while the roll 704 is rotated backwards to put tension on the label 402 and, ultimately, separate the label 402 from the roll 704 at the perforation. In any case, the label print head 702 then pushes the discrete label 402 onto the first sheet 502 of a print job, where the adhesive 414 affixes the label 402 thereon. Once the printed label 402 is affixed to the sheet 502, the controller causes the label print head 702 to retract back to its original position. Although the label application device 140 is depicted as being disposed over the sheet of paper 502, this configuration should not be considered as limiting. Rather, the label application device 140 need only be positioned proximate the paper sheets in order for the label print head 702 to affix the label thereon. Furthermore, the label print head 702 is illustratively discussed in terms of a single device for printing, separating, and affixing labels 402 to the sheets of paper 502. Alternately, three separate devices may be utilized to print, separate, and affix labels 402 to sheets of paper 502.

Figure 3:
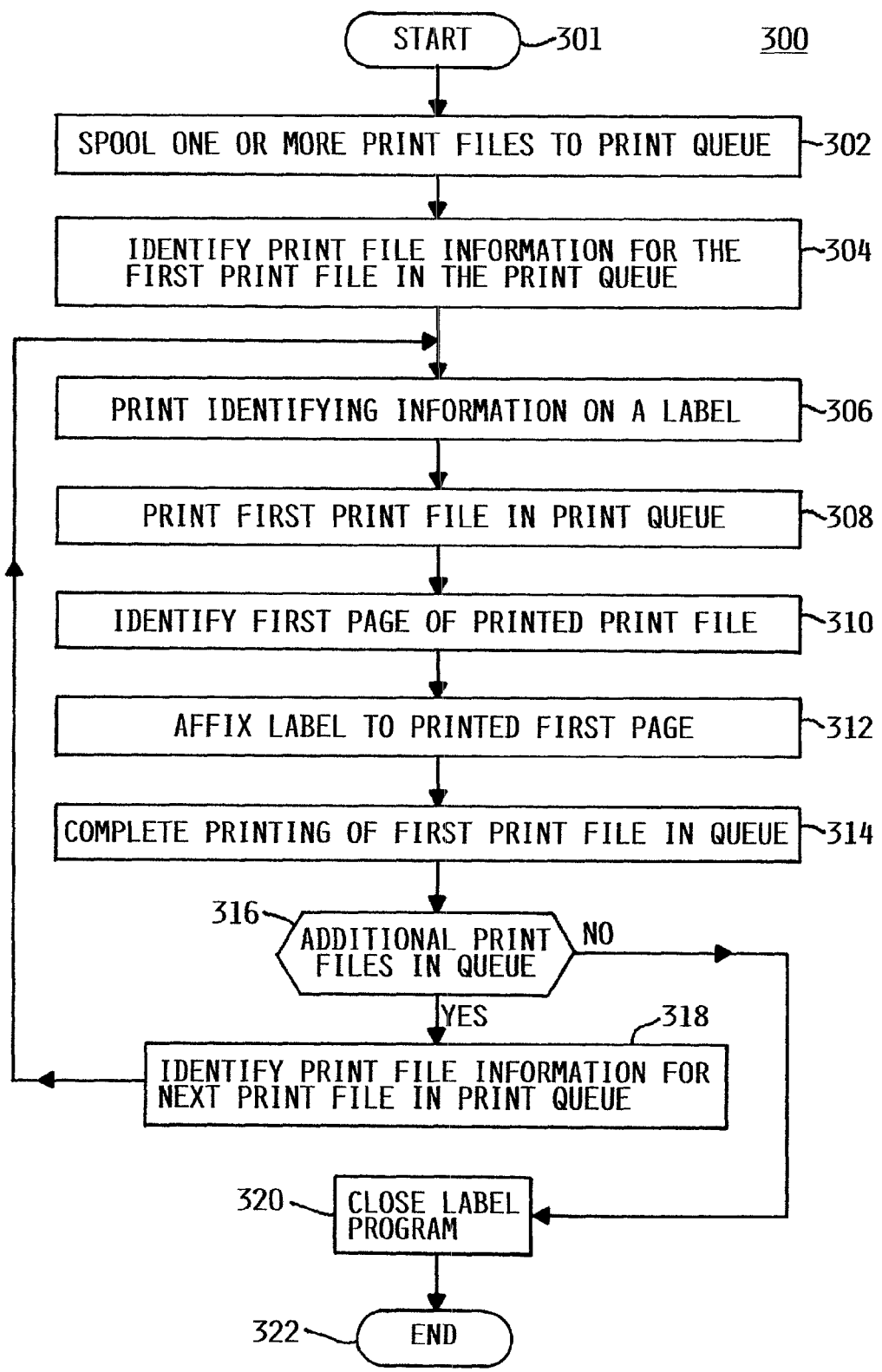
FIG. 3 depicts a flowchart of a method for affixing identifying labels of the present invention.

FIG. 3 depicts a flowchart of a method 300 for affixing identifying labels of the present invention. FIG. 3 should be viewed in conjunction with FIGS. 4 and 5. The method 300 begins at step 301, where the various users at the workstations 102 request printed output of subject matter from the users application programs 230, web pages, display devices 216, or other printable subject matter. The print requests are sent to the printing device 110 (e.g., printer) over the network 100 via the network cabling 112. In the embodiment of FIG. 1, the print requests are first sent to the print server 106. The print server 106 controls the flow of print jobs (requests) from the workstations 102 and other devices on the network 100 to the printers 110. The method 300 then proceeds to step 302.

In step 302, the print server 106 spools the print files sent from the various workstations 102 in a print queue. The print queue allows the print jobs to be printed in the order the print server 106 receives the print requests, while also permitting each user to continue to access their workstation without disruption or waiting for the print job to be completed.

In the embodiment of FIG. 1, the label program 224 is depicted as an application program 230 stored on the print server 106. The label program 224 is operational and running once the print server 206 is booted-up. Accordingly, the label program 224 monitors the print queue for print jobs received from the various workstations 102 on the communications network 100. In particular, in step 304, the label program 224 identifies the print file and other identifying information for the first print file in the print queue. The other identifying information may include the name of the person requesting the print job, the node (i.e., workstation ID), the date, time, file name, telephone extension of the requester, and any other textural identifying information pertinent to the user. Moreover, the identifying information may comprise symbols, one or more graphical images, various color codes, and the like. Once the identifying information is collected, at step 306, the print application device 140 prints the identifying information of a label for the first print job.

Referring to FIG. 3, at step 308, the print server 106 sends the first print file to the printer 110, where the first print file is printed in hard-copy form. At step 310, the label program 224 identifies (i.e., tracks) the first page of the print job, and the method 300 then proceeds to step 312. At step 312, the print application device 140 affixes the identifying label 402 onto the first page of the current print job. That is, the backside of the label 402 is affixed by the adhesive 414 to the front side of the first page of the current print job. The label 402 is affixed contemporaneously as the first page of the print job is completed. Alternately, the label 402 may be affixed after the first page of the print job is completed.

At step 314, the remaining pages of the print job (if any) are printed and the method 300 proceeds to step 316. At step 316, the label program 224 queries whether additional print files remain in the print queue at the print server 106. If, at step 316, the query is answered affirmatively, then the method proceeds to step 318. At step 318, the label program identifies the print file information for the next print file in the print queue and the method 300 then repeats steps 306 through 316 as described above. As such, the printer 110 prints a stack of printed pages from the numerous print jobs by the one or more users on the network 100. Moreover, each print job is identified and separated from the other print jobs by the labels 402 affixed by the print application device 140. If, however, at step 316, the query is answered negatively, then the method proceeds to step 320, where the label program 224 is closed. At step 322, the method 300 ends, where the label program 224 waits in a standby-mode for new print jobs.

FIG. 5 depicts the identifying labels of FIG. 4 affixed to a stack of print jobs. In particular, multiple printed print jobs $502_1$ though $502_w$ (collectively print jobs 502) are stacked, illustratively, at a print-receiving tray of the printer 110. Each print job may include one or more pages of paper (e.g., 8.5×11, Legal, or any other sized paper). The first page of each print job 502 has the label 402 affixed thereon to separate and identify each print job as discussed above.

In the embodiment shown in FIG. 5, the labels are staggered along the right margin of the first page of each print job 502. For example, the first print job $502_1$ in queue may have the label $402_1$ affixed at the top right margin. The second print job $502_2$ in the queue has the label $402_2$ affixed at the center portion of the right margin, while the third print job $502_3$ in the queue has the label $402_3$ affixed at the lower portion of the right margin. As such, the label program 224 then repeats the same pattern for the remaining print jobs 502 in the queue. In an alternate embodiment, the labels 402 are all positioned in the same location of each first page of each print job 502. Moreover, the labels 402 may be affixed to the first page of each print job 502 in any pattern or manner (e.g., top or bottom margins of the printed sheets of paper) that allows the users to identify and separate the print jobs 502 from each other.

The inventive label program 124 and label application device 140 provides a user or group of users the ability to separate and identify their print jobs from other print jobs at a shared printing device 110. Furthermore, the label program 124 and label application device 140 allows the users to reduce the consumption of consumable print mediums such as toner, ink cartridges, ink coated ribbons, paper, and the like, such that additional cost savings may be realized. Moreover, increased productivity may also be realized because of the time saved by not having to sort through stacks of printed material not relevant to the user at a shared printer.

Although several preferred embodiments that incorporate the teachings of the present invention have been shown and described in detail, those skilled in the art may readily devise many other varied embodiments that still incorporate these teachings.

What is claimed is:

1. A network printing apparatus, comprising:
   a network interface for receiving print jobs from a plurality of client devices on a network;
   a printing device for printing documents according to the received print jobs and comprising an output portion for dispensing the printed documents;
   a label application device disposed adjacent the output portion and configured for automatically affixing labels on the printed documents upon dispensation from the output portion without further user intervention, the label application device comprising:
     a label print head disposed proximate the output portion;
     a label mounting member disposed proximate the label print head and adapted to support a supply of labels; and a controller electrically coupled to the label print head and configured to control actuation and printing by the label print head to perform the automatic affixing of the labels to the printed documents in a manner that separates each printed document corresponding to a separate print job from a different one of the plurality of client devices.

2. The printing device of claim 1, wherein the label mounting member is adapted to support a roll of adhesive-backed labels.

3. The printing device of claim 1, wherein the label print head moves substantially perpendicular to the printed documents to print identifying information and affix one of the plurality of labels onto the printed documents.

4. The printing device of claim 1, wherein the label print head further comprises a label separator.

5. The printing device of claim 1, wherein the label print head is slidably coupled to at least one track.

6. The printing device of claim 1, wherein the network interface is configured for connection with a network server.

7. The printing device of claim 1, wherein the printed documents are selected from at least one of letter size paper, legal size paper, and A4 size paper.

8. The printing device of claim 1, wherein the printing device is one of an ink jet printer, a bubble jet printer, a laser printer, and a copier.

9. The printing device of claim 1, wherein the label print head further comprises a piston disposed proximate the label print head to affix one of the plurality of labels onto the printed documents.

10. The printing device of claim 1, wherein the label application device is configured to affix each label along a margin of a first sheet of a given print job.

11. The printing device of claim 10, wherein a portion of each affixed label extends over an edge of the respective first sheet.

12. The printing device of claim 1, wherein the label print head is configured to print source information on the labels prior to the labels being affixed to respective printed documents, the print source information identifying which of the one of the plurality of client devices initiated printing the respective printed document.

* * * * *